(12) United States Patent
Serizawa et al.

(10) Patent No.: US 10,750,429 B2
(45) Date of Patent: Aug. 18, 2020

(54) MULTIHOP WIRELESS COMMUNICATION SYSTEM, AGGREGATION DEVICE, AND WIRELESS TERMINAL

(71) Applicant: Hitachi, Ltd., Chiyoda-ku, Tokyo (JP)

(72) Inventors: Yasutaka Serizawa, Tokyo (JP); Takashi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 15/950,475

(22) Filed: Apr. 11, 2018

(65) Prior Publication Data

US 2018/0302837 A1 Oct. 18, 2018

(30) Foreign Application Priority Data

Apr. 12, 2017 (JP) ................. 2017-079213

(51) Int. Cl.
| | |
|---|---|
| *H04W 40/22* | (2009.01) |
| *H04B 7/14* | (2006.01) |
| *H04W 84/18* | (2009.01) |
| *H04W 88/04* | (2009.01) |
| *H04B 7/26* | (2006.01) |
| *H04W 72/12* | (2009.01) |

(52) U.S. Cl.
CPC .......... *H04W 40/22* (2013.01); *H04B 7/14* (2013.01); *H04B 7/2606* (2013.01); *H04W 72/1278* (2013.01); *H04W 84/18* (2013.01); *H04W 88/04* (2013.01)

(58) Field of Classification Search
CPC . H04W 40/22; H04W 72/1278; H04W 84/18; H04W 88/04; H04B 7/14; H04B 7/2606
See application file for complete search history.

(56) References Cited

U.S. PATENT DOCUMENTS

| | | | |
|---|---|---|---|
| 8,040,828 B2 * | 10/2011 | Kim .................. | H04L 12/12 370/311 |
| 10,142,796 B2 * | 11/2018 | Yamamoto ............. | H04W 4/70 |
| 2009/0210075 A1 | 8/2009 | Moriwaki | |
| 2011/0128910 A1 * | 6/2011 | Moriwaki .......... | H04L 41/0654 370/328 |

FOREIGN PATENT DOCUMENTS

JP  WO 2006/090480  7/2008

* cited by examiner

*Primary Examiner* — Luat Phung
(74) *Attorney, Agent, or Firm* — Crowell & Moring LLP

(57) ABSTRACT

There is provided a technique that enables flexible response to system configurations, application, and aims in a wireless connection sensor network system. A multihop wireless communication system includes an aggregation device and multiple wireless terminals connected to the aggregation device in wireless connection. The aggregation device includes, in a data request packet to request the data, a communication requirement to transmit data, and transmits the data request packet to the wireless terminal to be a data request destination terminal through the wireless terminal to be a relay terminal. The relay terminal and the data request destination terminal transmit a data packet including the requested data to the aggregation device in accordance with the communication requirement.

13 Claims, 14 Drawing Sheets

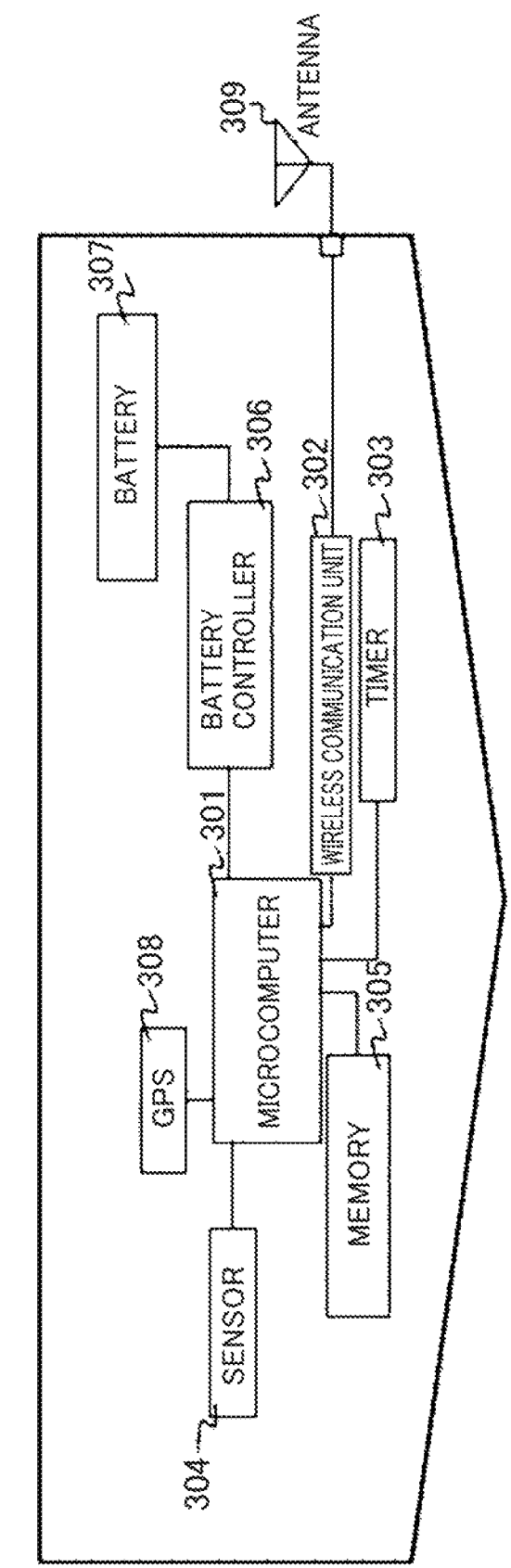

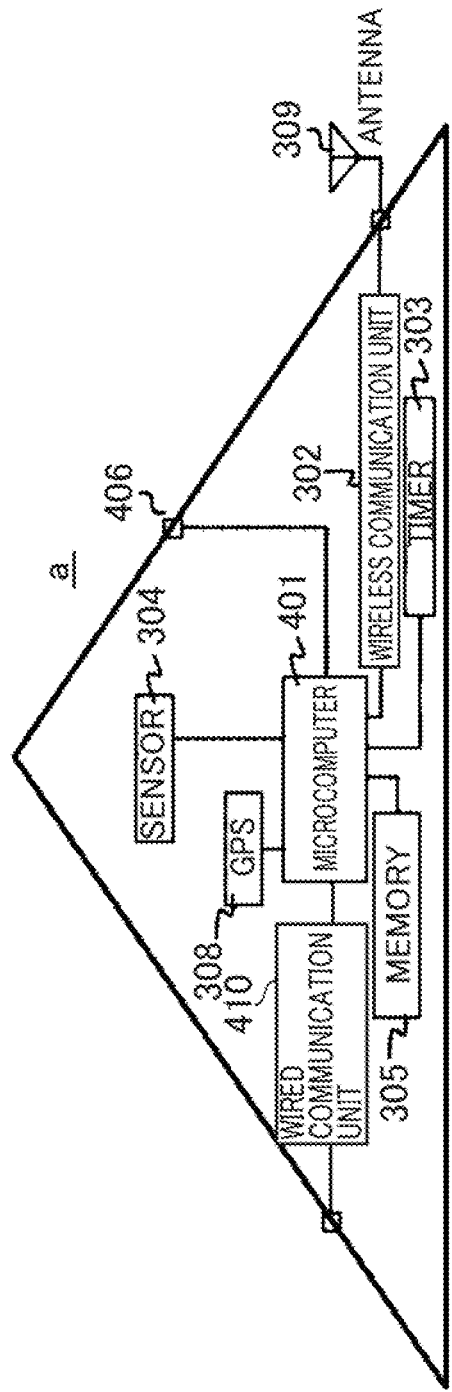

| TRANSMISSION \ RECEPTION | ai | sk (901) | s(k+1) | s(k+2) | s(k+3) | s(k+4) | s(k+5) | s(k+6) | s(k+7) |
|---|---|---|---|---|---|---|---|---|---|
| ai | --- | 01:05:01.000 / 01:05:01.100 | --- | --- | --- | --- | --- | --- | --- |
| sk | 01:05:02.500 / 01:05:02.600 | --- | 01:05:01.100 / 01:05:01.200 | --- | --- | --- | --- | --- | --- |
| s(k+1) | --- | 01:05:02.400 / 01:05:02.500 | --- | 01:05:01.200 / 01:05:01.300 | --- | --- | --- | --- | --- |
| s(k+2) | --- | --- | 01:05:02.300 / 01:05:02.400 | --- | 01:05:01.300 / 01:05:01.400 | --- | --- | --- | --- |
| s(k+3) | --- | --- | --- | 01:05:02.200 / 01:05:02.300 | --- | 01:05:01.400 / 01:05:01.500 | --- | --- | --- |
| s(k+4) | --- | --- | --- | --- | 01:05:02.100 / 01:05:02.200 | --- | 01:05:01.500 / 01:05:01.600 | --- | --- |
| s(k+5) | --- | --- | --- | --- | --- | 01:05:02.500 / 01:05:02.600 | --- | 01:05:01.600 / 01:05:01.700 | --- |
| s(k+6) | --- | --- | --- | --- | --- | --- | 01:05:01.900 / 01:05:02.000 | --- | 01:05:01.700 / 01:05:01.800 |
| s(k+7) | --- | --- | --- | --- | --- | --- | --- | 01:05:01.800 / 01:05:01.900 | --- |

CYCLE PERIOD = 1.6s

| TRANSMISSION \ RECEPTION | ai | sk | s(k+1) | s(k+2) | s(k+3) | s(k+4) | s(k+5) | s(k+6) | s(k+7) |
|---|---|---|---|---|---|---|---|---|---|
| ai | — | 01:05:02.500<br>01:05:02.600 | — | — | — | — | — | — | — |
| sk | 01:05:02.400<br>01:05:02.500 | — | — | — | — | — | — | — | — |
| s(k+1) | — | — | — | 01:05:02.300<br>01:05:02.400 | — | — | — | — | — |
| s(k+2) | — | — | — | — | 01:05:02.200<br>01:05:02.300 | — | — | — | — |
| s(k+3) | — | — | — | 01:05:02.100<br>01:05:02.200 | — | — | — | — | — |
| s(k+4) | — | — | — | — | — | — | 01:05:02.000<br>01:05:02.100 | — | — |
| s(k+5) | — | — | — | — | — | 01:05:01.900<br>01:05:02.000 | — | — | — |
| s(k+6) | — | — | — | — | — | — | — | 01:05:01.800<br>01:05:01.900 | — |
| s(k+7) | — | — | — | — | — | — | — | — | — |

703-2

CYCLE PERIOD = 0.8s

| HEADER SECTION | | | DATA SECTION | | |
|---|---|---|---|---|---|
| PACKET HEADER | MULTIHOP PATH INFORMATION | TIME TABLE | SESSION ID | PACKET ENDING FLAG | DATA PAYLOAD |
| 701 | 702 | 703 | 706 | 1801 | 707 |

MULTIHOP WIRELESS COMMUNICATION SYSTEM, AGGREGATION DEVICE, AND WIRELESS TERMINAL

CROSS-REFERENCE TO RELATED APPLICATION

This application claims the priority of Japanese Patent Application No. 2017-079213 filed Apr. 12, 2017, which is incorporated herein by reference in its entirety.

BACKGROUND

The present invention relates to a wireless network system, and more particularly to a technique of a multihop wireless communication system.

Coping with increasing demands for natural resources becomes an international task. In the field of resources surveys, necessity to reasonably provide survey sensor techniques of high sensitivity is increasing. Resource survey systems are acceleratingly shifted to large scale systems. The resource survey system has an increasing importance to measure subsurface structures in high resolution by densely arranging sensors.

For example, as one of primary methods used for identifying deposit sites of resources in resources surveys is a method referred to as reflection seismology. In this method, controlled seismic sources arranged on the ground surface generate artificial vibrations, and the vibrations are reflected and returned from layers under the ground, such as a soil layer, a water layer, layers that reserve petroleum and gases, and a basement rock layer. The waves of the returned vibrations are received by vibration sensors (acceleration sensors) arranged on the ground surface. The signal waveforms of the waves are analyzed to grasp stratum structures and crustal structures.

For the controlled seismic source, a special vehicle referred to as an earthquake simulation vehicle, which can artificially generate vibrations, is sometimes used. In the case of reflection seismology, an earthquake simulation vehicle that is a controlled seismic source, sensors to detect vibrations, a sensor network system that transfers acquired vibration data (in the following, referred to as "a sensor network"), and a data center to accumulate the acquired vibrations data (a data collection vehicle) are necessary in the research subject field.

However, a wired connection configuration has a limitation on the number of sensors that can provide simultaneous measurement. The wired connection configuration has restrictions on its installation design depending on obstructions, such as trees, rocks, and revers, which exist in research subject fields including forests and dense forests. The wired connection configuration needs field facilities, such as a large-capacity establishment to supply power to vibration sensors and a large-scale data center (a data collection vehicle). These contribute to cost increases in the sensor network. Therefore, a system configuration that omits wired connection while sensors are densely arranged is desired.

International Publication No. WO2006/090480 describes a network management method using small-sized wireless sensor nodes in which a base station and sensor nodes have counter values to be the references to the operation interval and the operation start phase of the sensor nodes, and the counter values are synchronized at regular time intervals.

SUMMARY

For systems that omit wired connection while sensors are densely arranged, the construction of resource survey systems using cableless systems is studied. The adoption of the cableless system enables a great reduction in installation costs. On the other hand, the implementation of the cableless system also needs the investigation of the battery drive of sensor terminals (i.e., low power operation) and the collection of a plurality of types of data (sensor data and information necessary for the operation and management of the system) according to the wireless multihop method.

In previously existing typical sensor networks, systems are controlled by prescribed routines that upload data from sensors to a server at regular time intervals. However, for example, in the case where the scale and conditions of measurement targets or requested data are diversified like resources surveys, there are various suitable communication requirements. For example, there are a wide variety of conditions of the field where sensors are arranged, and sensor data and data required for the system operation and management have different communication requirements to be sought.

In the time division access method for previously existing wireless sensor networks, the wireless sensor network is operated by writing fixed time slots on wireless sensor terminals. Thus, in an application that triggers a wireless sensor terminal to transmit data by an on-demand request from a user, the sensor terminal is woken up even though no data request is generated, and this increases power consumption. It takes time to again allocate the radio band once having been allocated to another terminal, and this increases down time.

Therefore, an object of the present invention is to provide a technique that enables flexible response to system configurations, use, and aims in a wireless connection sensor network system.

An aspect of the present invention is a multihop wireless communication system including an aggregation device and multiple wireless terminals connected to the aggregation device in wireless connection. The aggregation device includes, in a data request packet to request the data, a communication requirement to transmit data, and transmits the data request packet to the wireless terminal to be a data request destination terminal through the wireless terminal to be a relay terminal. The relay terminal and the data request destination terminal transmit a data packet including the requested data to the aggregation device in accordance with the communication requirement.

Another aspect of the present invention is an aggregation device configured to aggregate data from multiple wireless terminals by multihop wireless communication. The aggregation device generates a data request packet to request the data, and transmits the data request packet to the wireless terminal to be a data request destination terminal through the wireless terminal to be a relay terminal. Here, the data request packet includes a temporary timetable indicating at least one timing to transmit and receive the data at the wireless terminal to be the relay terminal and the wireless terminal to be the data request destination terminal.

Still another aspect of the present invention is a wireless terminal to be a wireless terminal to be a source terminal for transmitting data or a relay terminal used for a multihop wireless communication system. When the wireless terminal receives a data request packet to request the data as the relay terminal, the wireless terminal stores information indicating transmission timing and reception timing of the wireless terminal included in the data request packet. The wireless terminal transmits and receives the requested data based on the transmission timing and the reception timing.

In accordance with the present invention, a technique that enables flexible response to the use and purpose of a wireless connection sensor network system. Objects, configurations, and effects other than ones described above will be apparent from the description of an embodiment below.

BRIEF DESCRIPTION OF THE DRAWINGS

FIG. 3 is a block diagram of the internal configuration of a wireless sensor terminal according to the embodiment;

FIG. 4 is a block diagram of the internal configuration of an aggregator according to the embodiment;

FIG. 5 is a table of the parameters of data to be transmitted in the embodiment;

FIG. 9 is a temporary timetable according to the embodiment;

FIG. 17 is a temporary timetable of (uplink) timing at which the wireless sensor terminal according to the other embodiment transmits and receives data;

FIG. 18 is a table of the packet format of a request packet (downlink) according to yet another embodiment.

DETAILED DESCRIPTION

Figure 1:
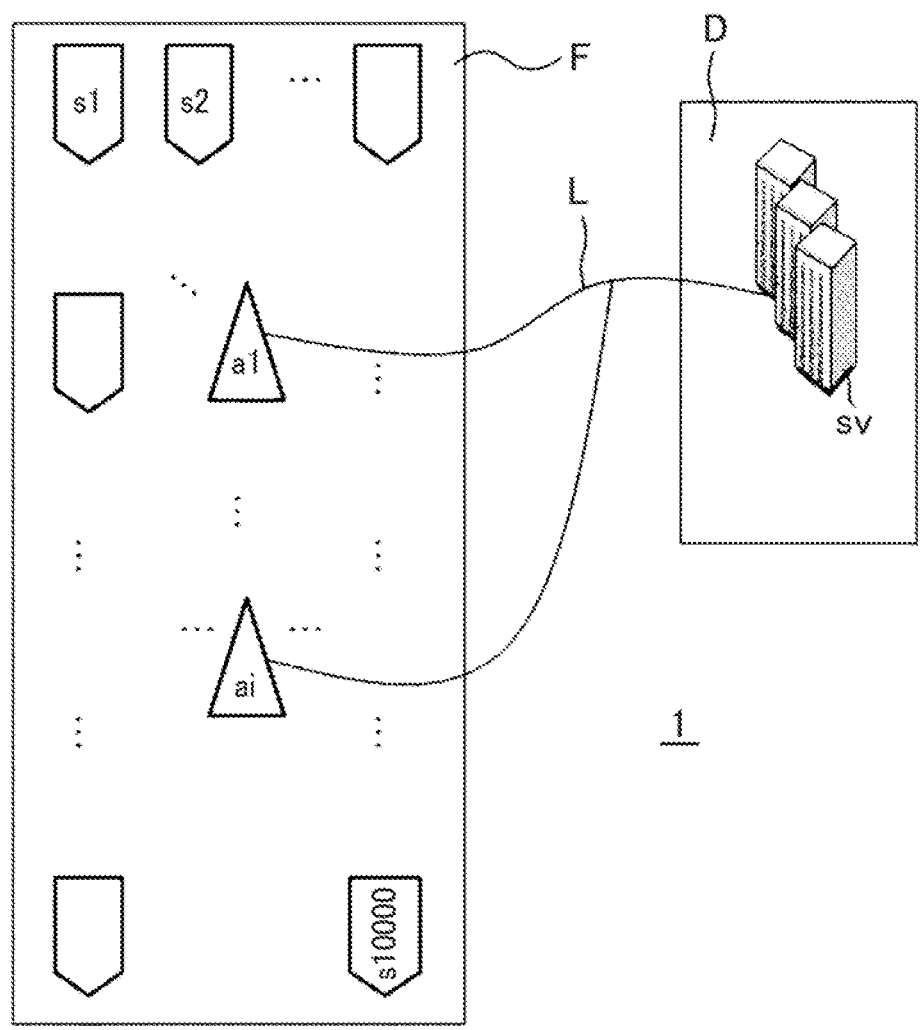
FIG. 1 is a schematic plan view of the overall structure of a wireless sensor network system according to an embodiment.

In the following, embodiments of the present invention will be described with reference to the drawings. Note that, the embodiments of the present invention are not limited to the embodiments described later. The embodiments can be variously modified in the scope of its technical idea.

In the configurations of the embodiments of the present invention described below, the same components or components having similar functions are designated the same reference signs among different drawings in common, and the duplicate description is sometimes omitted.

The notations "first", "second", and "third", for example, in the present specification are written to identify components, and the notations do not limit numbers, order, or contents. The numbers to identify components are used in individual contexts.

A number used in one context does not always indicate the same configuration in another context. A component identified by a certain number may also indicate the function of a component that has been identified by another number.

Locations, sizes, shapes, ranges, and other parameters of configurations illustrated in the drawings do not sometimes illustrate actual locations, sizes, shapes, ranges, and other parameters for easily understanding the embodiments of the present invention. Thus, the embodiments of the present invention are not necessarily limited to locations, sizes, shapes, ranges, and any other parameter disclosed in the drawings.

As described later, the installation of the state transition flows in the embodiments is assumed through the execution of software on a general-purpose computer including a microcomputer (in the following, referred to as "a microcomputer" or "a processor"). However, the state transition flows maybe installed through dedicated hardware or the combination of software and hardware. Specific numerical values used in the embodiments below are numerical values for describing the embodiments, and are non-limiting numerical values in the following description.

In the case where there are elements having the same or similar functions, the same reference signs sometimes have addition of different subscripts in the description. However, in the case where elements do not have to be distinguished from each other, subscripts are sometimes omitted in the description.

In the embodiments below, an example will be described. In the example, a "temporary" timetable is inserted into a request packet (downlink) generated on demand. The temporary timetable describes (uplink) timing that is valid in this session, and a wireless sensor terminal transmits and receives data at this timing. The correct time is grasped with a global positioning system (GPS), for example, and thus the transmitting and receiving of a packet at time described in the temporary timetable is established.

An example will be described. In the example, a wakeup receiver that is waitable for reception at low power consumption is installed connected to the wireless sensor terminal. Prior to a request packet (downlink) generated on demand, a wakeup packet is sent to the wakeup receiver to wake up the wireless sensor terminal anytime, and then the request packet (downlink) is sent. Thus, communication is established on demand even though the wireless sensor terminal is constantly in sleep mode.

First Embodiment (1-1) Wireless Sensor Network System

FIG. 1 is the overall structure of a wireless sensor network system 1 according to a first embodiment (in the following, referred to as "the system 1"). The system 1 is configured of wireless sensor terminals $s_1$ to $s_{10000}$ and aggregators $a_1$ to $a_i$ (i represents a given numerical value) that aggregate the data of the wireless sensor terminals arranged in a measurement target field F, and data servers sv arranged in a data center D.

Note that, the system 1 in a narrow sense is configured of the wireless sensor terminals $s_1$ to $s_{10000}$ and the aggregators $a_1$ to $a_i$ arranged in the measurement target field F. The aggregators a each function as an aggregation point for a cell. A plurality of cells forms the system 1 in an assembly.

The system 1 according to the embodiment has a large system scale, and has the wireless sensor terminals s densely arranged. In the case of the embodiment, ten thousand wireless sensor terminals s are used. However, the number is a given number. Therefore, a large number of the wireless sensor terminals s are arranged, or a small number of the wireless sensor terminals s are arranged. As described later, the wireless sensor terminals s include various sensors and wireless communication functions. The wireless sensor terminals s and the aggregators a are arranged at intervals of five to ten meters, for example. Intervals are also set optionally.

The aggregator (i.e., the wireless data aggregation device) a aggregates data sensed by various sensors installed on the individual wireless sensor terminals s (in the following, also referred to as "sensor data") by wireless multihop communication through one or a plurality of wireless sensor terminals s in wireless connection to each other. Here, the term "wireless multihop communication" means a wireless communication method in which a wireless sensor terminal s transmits data, and the other wireless sensor terminals s located around that wireless sensor terminal s receive and again transmit the data, which is relay transmission, to the aggregator. That is, one or a plurality of wireless sensor terminals that relays data is present between the wireless sensor terminal that is a source to transmit data and the aggregator. This method enables data collection in a wide range.

The aggregators a are arranged in the measurement target field F at predetermined intervals, and individually aggregate data from about 100 to 1,000 wireless sensor terminals s. Of course, this numerical value is an example. Note that, the measurement target field F is not limited to the outdoors. The measurement target field F may be indoor fields, or may be fields having indoor and outdoor fields.

The aggregators a transmit the aggregated data to the data server sv in the data center D through communication cables L. In the present specification, the term "data" can include physical quantity data acquired by various sensors as well as can include information necessary for one or both of the operation and management of the system.

Note that, data or communication transmitted from the aggregators a to the wireless sensor terminals s is referred to as "downlink" data or communication, and data or communication transmitted from the wireless sensor terminals s to the aggregators a is referred to as "uplink" data or communication.

(1-2) Wireless Multihop Connection in a Cell

Figure 2:
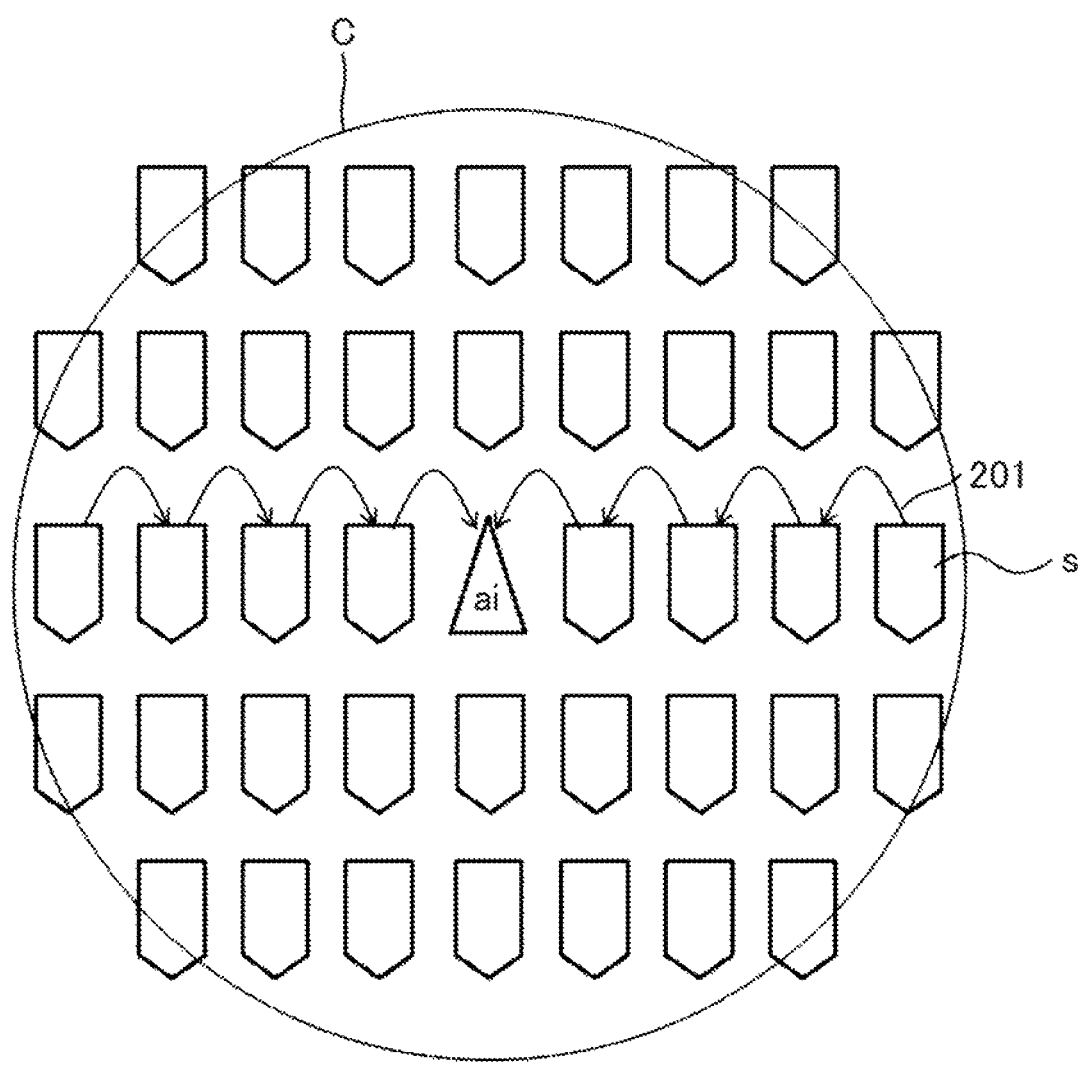
FIG. 2 is a schematic plan view of the configuration of the inside of a cell of the wireless sensor network system according to the embodiment.

Referring to FIG. 2, wireless multihop connection in a cell in the measurement target field F will be described. Note that, FIG. 2 illustrates a part of the measurement target field F in detail in FIG. 1. In FIG. 2, examples of typical installation intervals of the wireless sensor terminals are about 10 m to 50 m, and the distance that enables wireless communication is assumed to be about 50 m to 100 m.

As illustrated in FIG. 2, a wireless multihop network in a cell configures a tree wireless multihop network having the aggregator $a_i$ as an aggregation point to request data/collect data. In FIG. 2, examples of packet transmission paths in wireless multihop are indicated with arrows 201.

A range C of a cell ideally has a circular shape as illustrated in FIG. 2. However, the range C is a boundary substantially determined by a maximum multihop number parameter that the aggregator $a_i$ and the wireless sensor terminals s hold in common.

(1-3) Configuration of the Wireless Sensor Terminal

FIG. 3 illustrates an exemplary internal configuration of the wireless sensor terminal s. Note that, all the components illustrated in FIG. 3 do not necessarily have to be installed on the wireless sensor terminal. A configuration may be possible in which only a part of the components is installed, or a configuration may be possible in which another component, not shown, is additionally provided.

The wireless sensor terminal illustrated in FIG. 3 has a microcomputer 301, a wireless communication unit 302, a timer 303, a sensor 304, a memory 305, a battery controller 306, a battery 307, a global positioning system (GPS) signal receiving unit 308, and an antenna 309.

The microcomputer 301 controls the operations of the wireless communication unit 302, the timer 303, the sensor 304, the memory 305, the battery controller 306, and the GPS signal receiving unit 308 in accordance with control programs recorded on the memory 305 or an internal memory, and controls the states of the overall terminals through this control. Although the internal configuration of the microcomputer 301 is not shown, the microcomputer 301 has the configuration of a general-purpose microcomputer including a processor, a memory, and an input/output interface. For the memory, the memory 305 provided in the outside of the microcomputer 301 may be used. The wireless sensor terminal s is assumed to be basically driven by the battery 307 with no external power feed. Since low power consumption is desirable, the memory 305 is desirably a non-volatile memory like a flash memory, for example.

The sensor 304 returns a sensor value to the microcomputer 301 in response to a sensor acquisition request received from the microcomputer 301. Although the sensor 304 is a vibrometer, for example, the sensor 304 may be another sensor, such as a thermometer and a hygrometer. The microcomputer 301 stores the acquired sensor value on the memory 305 (or the memory in the microcomputer 301).

The GPS signal receiving unit 308 is used for identifying a place where a wireless sensor terminal (a self-owned terminal) is installed as well as used for synchronizing the acquisition time to acquire sensor data by a large number of the wireless sensor terminals s present in the measurement target field F. However, in general, the synchronization of the acquisition time is also enabled by exchanging packet information with other wireless sensor terminals using the wireless communication unit 302, not the synchronization of timing of acquiring sensor data by receiving the GPS signals.

The wireless communication unit 302 receives (or demodulates) a wireless notification packet or wireless communication packet received from the other terminals (the wireless sensor terminals s), and transfers the packet to the microcomputer 301. The wireless communication unit 302 converts (modulates) a reply from the microcomputer 301 into a wireless communication packet, and transmits the packet to an external space through the antenna 309. Note that, the microcomputer 301 also responds to backup in the case where the implementation of wireless control fails due to wireless packet errors, for example, and to state transition for time management of microcomputer control using the timer 303.

(1-4) Configuration of the Aggregator

FIG. 4 illustrates an exemplary internal configuration of the aggregator a. Note that, all the components illustrated in FIG. 4 do not necessarily have to be installed on the aggregator a. A configuration may be possible in which only a part of the components is installed, or a configuration may be possible in which another component, not shown, is additionally provided.

A part of the configuration of the aggregator a only has to be the same configuration of the wireless sensor terminal s. Thus, similar elements are designated the same reference signs, and the description is omitted. The difference of the aggregator is that the aggregator is additionally provided with a power supply interface (IF) 406 and a wired communication unit 410. The aggregator a is also installed with a sensor 304. The aggregator a also functions as a wireless sensor terminal using the sensor 304.

Unlike the wireless sensor terminal s, the aggregator a operates with a supply of electric power through the power supply interface (IF) 406. Because of the supply of electric power through the power supply interface (IF) 406, a central processing unit (CPU) having processing performance higher than that of the microcomputer 301 of the wireless sensor terminal s can be used for the microcomputer 401.

The microcomputer 401 converts aggregated sensor data (wireless packets) from the wireless sensor terminals s through the antenna 309 and the wireless communication unit 302 into a wired packet, and then outputs the packet to the wired communication unit 410. The wired communication unit 410 that is an interface with external devices transmits the wired packet to the data server sv through the communication cable L.

(1-5) Data Types to be Handled and Specifications to be Sought

In the embodiment, in order to collect information necessary for sensor data and system operation and management, there are the execution of prescribed routines that upload data from the sensors to the server at regular time intervals as well as various communication requirements described below.

First, since the wireless sensor terminal that collects data has no power supply cable, the wireless sensor terminal is desired to continuously operate for a long time, a few tens of days or longer, for example, using a battery.

A plurality of types of data suitable for purposes are assumed for data obtained from the wireless sensor terminals. Thus, a configuration is sought, which can communicate a plurality of types of data under different conditions.

In order to achieve low power consumption of the wireless sensor terminal, a scheme is sought, in which the wireless sensor terminal transmits data using an on-demand data request (downlink communication) from a user as a trigger.

When the wireless sensor terminals to which the communication band is allocated can be dynamically changed, the load of the wireless sensor terminals can be distributed.

FIG. 5 describes main parameters of multidata types assumed in the embodiment. The status is information indicating the state of the sensor, including the health state, GPS information, and the remaining amount of a battery. The noise level indicates sensor data (no input is available) at a certain point in time. The noise level is information provided for the user to determine whether to start a survey test by measuring environment noise immediately before starting the survey test by generating an earthquake using an earthquake simulation vehicle. Data (a snapshot) is the raw data of reflected waves acquired by the sensor after generating the earthquake.

Although data items #1 to #3 in FIG. 5 have the same directions (on-demand two-way communication), their requirements are entirely different from each other including the number of occurrence of communication, the data volume, the delay time request, and the acquisition target range. However, it is desirable to transmit all of these items of data in the same wireless multihop system configuration.

Here, the term "targeted terminal" means the number of the wireless sensor terminals s to be communication targets. The concept "five terminals per cell" in the targeted terminal column means the number of targeted wireless sensor terminals per cell in the case where a large-scale sensor network configured of a few tens of thousands to a hundred thousand or more of the wireless sensor terminals s is divided by a plurality of cells.

In the case where the data types of items #1 to #3 are acquired from the sensor, the wireless sensor terminal transmits (uplinks) data in the form in which the wireless sensor terminal responds to a request packet (downlink) generated on demand from the user.

In order to satisfy the requirements for low power consumption and the communication conditions, for "item #2: noise level" and "item #3: data (a snapshot)" acquired for "five terminals per cell" in "the targeted terminal", a method is preferable, with which these data items are acquired by each five terminals different in turns, not by a method with which data items are acquired by the same specific five terminals every time. Therefore, the necessity is to dynamically change the wireless sensor terminals in operation to which the communication band is allocated.

In previously existing communication methods for a wireless sensor network, a method is adopted. In the method, a dedicated communication band that avoids interference is secured based on scheduling by allocating dedicated time slots for transmitting and receiving data (in the order of microseconds) in a fixed manner for the requirements by a time division access method. The previously existing method has merits that enable low power consumption by delicate intermittent operation. However, the previously existing method has two major problems below. The first problem is that even though no data request is generated, the wireless sensor terminal is woken up to increase power consumption. The second problem is that it takes time to again allocate the radio band once having been allocated to another terminal, and this increases down time. Note that, the problems of the resource survey system are described as specific examples. However, these technical problems are observed in common among wireless sensor networks adopting similar requirements.

(1-6) Wireless Multihop Communication Using a Temporary Timetable

Next, a communication method using a temporary timetable according to the embodiment will be described.

Figure 6:
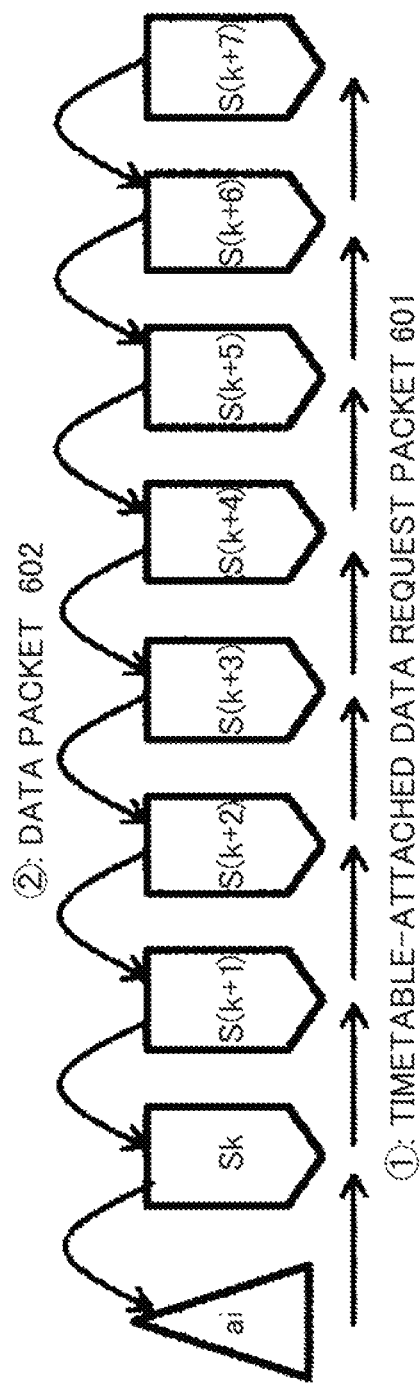
FIG. 6 is a schematic diagram illustrating the order of transmitting packets in multihop data transmission according to the embodiment.

FIG. 6 illustrates the order of transmitting packets in multihop data transmission according to a communication method using a temporary timetable. In FIG. 6 for illustration, in wireless multihop connection in a cell in FIG. 2, only one path among the paths to reach the aggregator $a_i$ is extracted.

Here, the aggregator $a_i$ generates a temporary timetable valid in a session, which is a series of data sequences triggered by a data request packet. The temporary timetable is used as a timetable-attached data request packet 601 to be sent to a data request destination wireless sensor terminal $s_{(k+7)}$ in multihop transmission.

Figure 7:
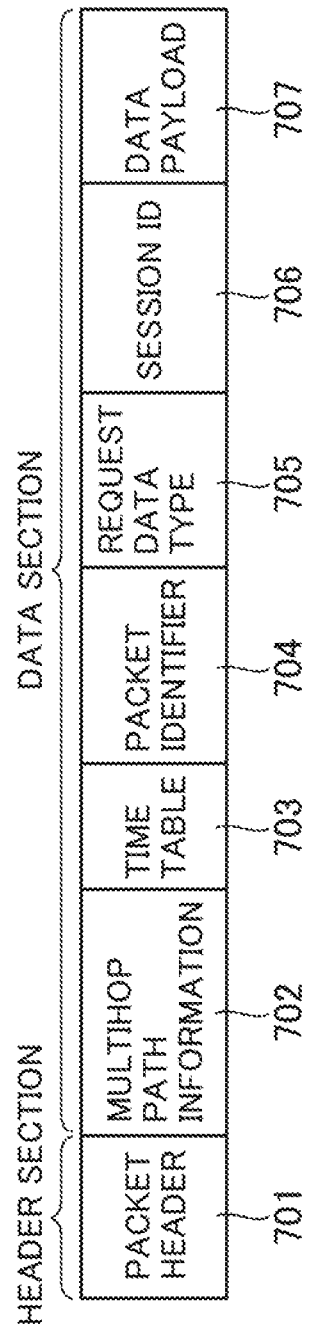
FIG. 7 is a table of the packet format of a request packet (downlink) according to the embodiment.

FIG. 7 illustrates the content of the data request packet 601 to be sent from the aggregator $a_i$. In accordance with a typical data packet configuration, the data request packet 601 includes a packet header 701 that indicates a destination, a packet identifier 704 that identifies whether to be an uplink packet or a downlink packet, a request data type 705 that indicates what data is requested, a session ID 706 that identifies an established session, a data payload 707 that is a main body of date, and other sections.

In the embodiment, the data request packet 601 includes a temporary timetable 703 and multihop path information 702. The multihop path information 702 indicates the transfer of a packet through which wireless sensor terminals s in what order. The multihop path information 702 includes the IDs of transfer destination sensor terminals s, for example. Note that, the locations to store the temporary timetable 703 and the multihop path information 702 are not limited to the locations in the example of FIG. 7.

As illustrated in FIG. 6, the data request packet 601 is sent from the aggregator $a_i$ to the wireless sensor terminal $s_{(k+7)}$ in multihop transmission through the wireless sensor terminals $s_k$ to $s_{(k+6)}$. The wireless sensor terminals $s_k$ to $s_{k+6}$, which are the multihop relay stations with the data request packet 601 received, store the timetable 603 of the data request packet 601 received in packet transfer on the memory 305 for registration.

In the same session, the wireless sensor terminals s are woken up based on the time and the period described in the temporary timetable 703 to transmit and receive the packet. Upon receiving the data request packet 601, the data request destination wireless sensor terminal $s_{(k+7)}$ generates data requested based on the request data type 705. The data request destination wireless sensor terminal $s_{k+7)}$ stores the temporary timetable 703 of the received data request packet 601 on the memory 305 for registration.

The wireless sensor terminal $s_{(k+7)}$ transmits the requested data packet 602 to the prescribed destination at prescribed timing in accordance with the description (in inverse order) of the temporary timetable 703 and the multihop path information 702 attached to the data request packet 601.

The data request packet 601 is transmitted to the wireless sensor terminal s in a manner, for example, that the microcomputer (or the processor) 401 of the aggregator a generates the data request packet 601 based on data stored on the memory 305 and the data request packet 601 is transmitted to the wireless sensor terminal s from the wireless communication unit 302 through the antenna 309.

Figure 8:
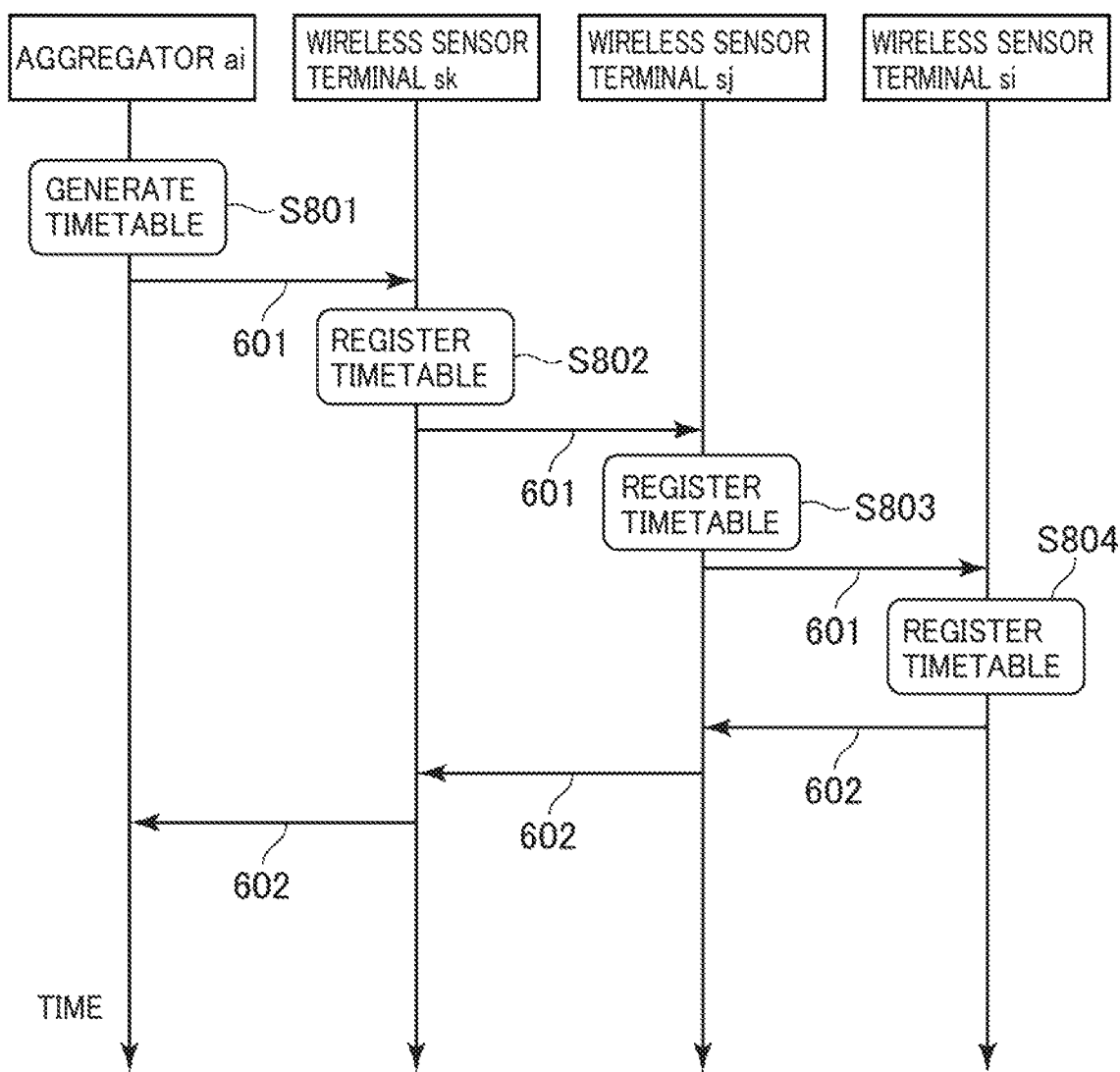
FIG. 8 is a time chart of the operation of wireless multihop communication according to the embodiment.

FIG. 8 illustrates a time chart of the communication sequence. The wireless sensor terminals are simplified to three wireless sensor terminals $s_k$, $s_j$, and $s_i$. However, the number of wireless sensor terminals (the number of hops) is optional. In process S801, the microcomputer 401 of the aggregator $a_i$ generates and stores the temporary timetable 703 on the memory 305. Note that, the temporary timetable 703 maybe received from an external device outside the aggregator $a_i$ through the wired communication unit 410, not a manner that the microcomputer 401 generates the temporary timetable 703.

The generated temporary timetable 703 is included in the data request packet 601, and reached at the wireless sensor terminal $s_i$ through the wireless sensor terminals $s_k$ and $s_j$. The wireless sensor terminals s store a copy of a necessary portion of the temporary timetable 703 on the memory 305.

The requested data packet 602 is transmitted to the aggregator $a_i$ from the wireless sensor terminal $s_i$ in wireless multihopping communication based on the schedule of the temporary timetable 703.

The wireless sensor terminals s can know transmission timing and reception timing based on the schedule of (a copy of) the temporary timetable 703 that the wireless sensor terminals s have. Thus, in the period in which the transmitting or receiving of no packet is necessary, power consumption can be reduced by the transition to the sleep state. That is, immediately before the period for transmitting and receiving packets, the wireless sensor terminal s wakes up from the sleep state, whereas the wireless sensor terminal s returns to the sleep state immediately after the period. Here, the term "sleep state" means the state in which power consumption can be reduced by turning off a part of the functions of the circuit, or by decreasing the clock frequency, for example. The sleep state can take various forms to turn off, for example, which circuit depending on purposes. In the embodiment, in the sleep state, the circuit to manage time, such as the timer 303, is operated, whereas a part of the microcomputer 301 or the wireless communication unit 302 is turned off.

FIG. 9 illustrates a specific example of the temporary timetable 703 for implementing the sequences illustrated in FIGS. 6 and 8. The temporary timetable 703 specifies transmitter terminal IDs, receiver terminal IDs, and wakeup time and finish time to transmit and receive packets by "hour: minute: second". The upper part in each of frames 901 indicates wakeup time to transmit and receive packets, and the lower part indicates finish time.

Upon receiving the data request packet 601, the wireless sensor terminals s store information about waking up timing and finishing timing to transmit and receive packets at which at least the self-owned terminal transmits and receives packets on the memory 305. The wireless sensor terminals s transmit and receive packets at these timings. Of course, a copy of the temporary timetable 703 may be simply stored on the memory 305. Although this uses a large area of the memory, processing is easy.

The temporary timetable 703 defines transmission timing and reception timing for the aggregators a and the wireless sensor terminals s. For example, in the time frame from wakeup time "01:05:01.000" to finish time "01:05:01.100", the aggregator $a_i$ transmits a packet and the wireless sensor terminal $s_k$ receives a packet. Note that, time units are options, which may be absolute time or relative time. The arrangement of the wireless sensor terminals s in a time series based on such communication time is equivalent to the multihopping route.

Since the temporary timetable 703 can be freely defined, the communication requirements or the communication conditions can be freely set, such as a condition which terminal is caused to communicate at which timing. Communication conditions, such as the number of the terminals to be used, the assignment of specific terminals, the multihopping route, the length of transmitting and receiving time, and intervals, can be freely set. Therefore, the preparation of the optimum temporary timetable 703 suitable for data types to be requested enables efficient, flexible system operation.

The temporary timetable 703 in FIG. 9 shows the multihopping route in FIG. 6. However, one wireless sensor terminal s is sometimes included in a plurality of multihopping routes. In this case, the wireless sensor terminal s has a plurality of temporary timetables 703 for each of the multihopping routes. The temporary timetable 703 illustrated in FIG. 9 can be generated suitable for each data type illustrated in FIG. 5. Also in this case, the wireless sensor terminal s has a plurality of temporary timetables 703 for each data type.

When a plurality of temporary timetables 703 is set in such a manner that transmitting and receiving do not interfere with each other, the plurality of temporary timetables 703 can be used simultaneously. In this case, the sensor terminal s stores the plurality of temporary timetables 703 on the memory 305.

The value of "the cycle period" gives the period to repeatedly execute the temporary timetable. Thus, even though the time described in the table is past time in the reception of the temporary timetable, next communication timing and later timing can be known. For example, in the example in FIG. 9, it takes 1.6 seconds to transmit back and forth downlink data and uplink data. Thus, the cycle period can be repeated for a 1.6-second period using the time described in the timetable as wakeup time. Defining the cycle period enables automatic second-time data transmission after one period, even though the first-time data transmission is an error. Note that, in the example in FIG. 9, downlink communication and uplink communication are in symmetry (one-to-one correspondence). However, these communications may be in asymmetry. For example, a configuration may be possible in which the cycle period is applied to uplink communication (e.g. data transmission) for downlink communication in one time (e.g. a data request), and the uplink communication is transmitted a plurality of times.

Note that, in order to execute synchronized communication using this timetable, time synchronization between the wireless sensor terminals is necessary by another method. However, in the case of the resource survey system, since the sensor has the GPS, time synchronization between the wireless sensor terminals can be utilized using the time synchronization function of the GPS. However, time synchronization may be implemented separately using the wired communication unit 410 or the wireless communication unit 302.

(1-7) Operation of the Aggregator

Figure 10:
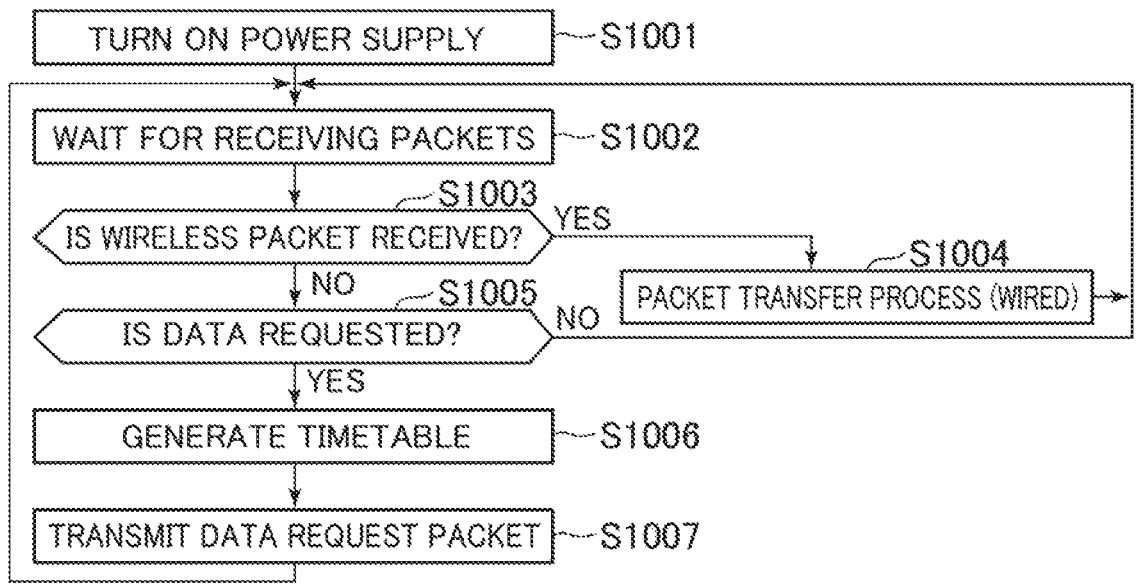
FIG. 10 is a flowchart of the operation of aggregators according to the embodiment.

FIG. 10 is a flowchart of the operation of the aggregator $a_i$. After the power supply is turned on (S1001), the aggregator $a_i$ moves to the wait for receiving packets state (S1002). When receiving a wireless packet (Y in S1003), the aggregator $a_i$ executes a packet transfer process on a wired section using the wired communication unit 410 (S1004).

However, when receiving no wireless packet (N in S1003) and receiving a data request from the application or the data server sv (S1005), the aggregator $a_i$ generates a temporary timetable (S1006), includes the temporary timetable in the data request packet, and transmits the packet as a desired data type of request packet (S1007).

Here, the microcomputer 401 of the aggregator $a_i$ generates the temporary timetable 703. After the temporary timetable 703 is generated, the temporary timetable 703 is stored on the memory 305. Alternatively, the data server sv generates the temporary timetable 703, and gives the temporary timetable 703 to the aggregator. In generating the temporary timetable 703, the temporary timetable 703 is generated in such a manner that the same time slot does not include a plurality of times of transmitting and receiving packets and data can be transferred for a short time in order to enable the implementation of a temporary time division access method. In the case where a data request is simultaneously issued to a plurality of wireless sensor terminals (broadcast or multicast), the timetable has to be generated with no temporal overlap between all the necessary communication timings (communication timings for all the data requests/data replies) in this session.

(1-8) Operation of the Wireless Sensor Terminals

Figure 11:
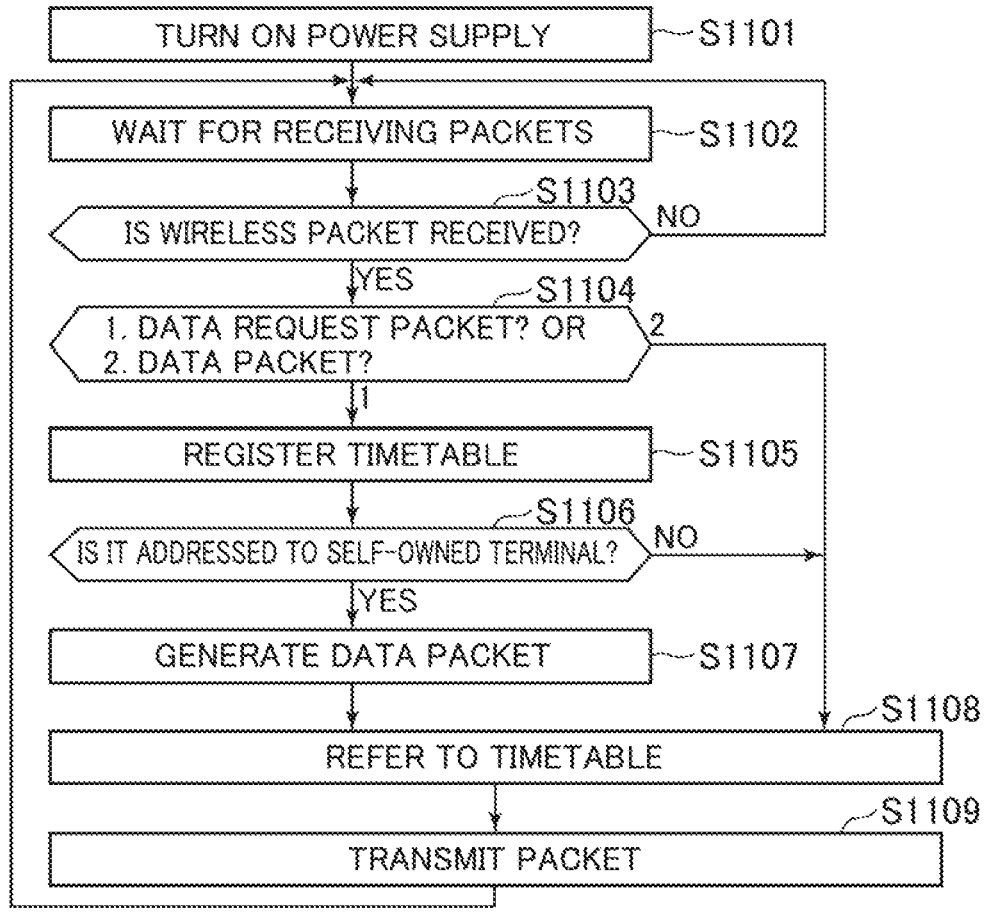
FIG. 11 is a flowchart of the operation of wireless sensor terminals according to the embodiment.

FIG. 11 is a flowchart of the operation of the wireless sensor terminals $s_k$, $s_j$, and $s_l$. After the power supply is turned on (S1101), the wireless sensor terminals move to the wait for receiving packets state (S1102). When receiving no wireless packet, the wireless sensor terminals keep the wait for receiving packets state as they are.

When receiving a wireless packet (S1103), if the packet is a data packet (uplink) (2 in S1104), the wireless sensor terminals make reference to the registered temporary timetable (S1108), and transmit the packet at a predetermined timing (S1109).

On the other hand, if the received wireless packet is a data request packet (downlink) (1 in S1104), the wireless sensor terminals register the temporary timetable 703 in the data request packet on the memory of the wireless sensor terminals (S1105). If the packet is not addressed to the wireless sensor terminals (N in S1106), the wireless sensor terminals transmit (transfer) the packet in accordance with the timetable. On the other hand, if the self-owned terminal is addressed to the wireless sensor terminals (Y in S1106), the wireless sensor terminals generate a requested data packet in the request data type 705 (S1107), and transmit the generated data packet in accordance with the timetable (S1108, S1109).

Second Embodiment

In the first embodiment, a specific example of the communication control method is described in which the temporary timetable 703 is introduced to avoid unnecessary wireless radio wave transmission and to avoid interference, which are main purposes. However, in actual wireless multihopping, power consumption in waiting for reception also account for a large ratio. Therefore, in a second embodiment, a specific example of a wireless multihop network is described. In the wireless multihop network, an on-demand waking up method using a wakeup receiver is introduced to eliminate unnecessary wakeup. Thus, data items having a plurality of data types can be acquired by an on-demand request from a user while low power consumption is implemented.

Figure 12:
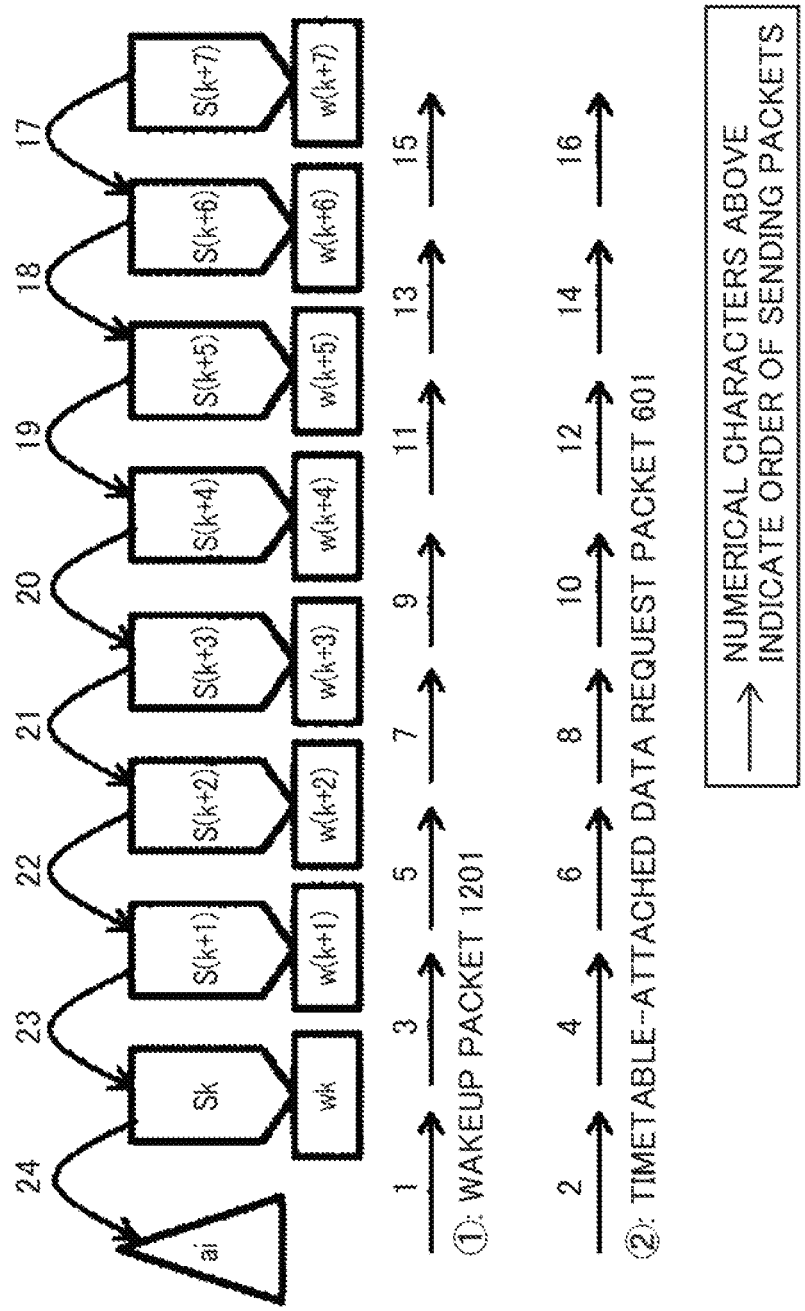
FIG. 12 is a schematic diagram illustrating the order of transmitting packets according to an embodiment.

FIG. 12 illustrates the order of transmitting packets in multihop data transmission according to a communication method using a temporary timetable 703 and wakeup receivers w. Arrows in FIG. 12 indicate the directions of transmitting packets. Numerical characters added to the arrows indicate the order of sending the packets.

The wakeup receivers w are provided attached to wireless sensor terminals s. In the case of using the wakeup receivers w, the wakeup receivers w are constantly operated in the wait for receiving packets state. However, the default of all the wireless sensor terminals s can be the sleep state. The wakeup receivers w are designed to have relatively low power consumption in the wait for receiving packets state by omitting functions, for example, compared with the wireless sensor terminals s.

As illustrated in FIG. 12, communication is started by transmitting a wakeup packet 1201 to a hop destination. The wakeup packet 1201 is in turn delivered to wakeup receivers $w_k$ to $w_{(k+7)}$ that are hop destinations. Thus, the wakeup receivers w wake up their wireless sensor terminals s. As a result, wireless sensor terminals $s_k$ to $s_{(k+7)}$ in turn wake up from the sleep state, and move to the wait for receiving packets state.

After moving to the wait for receiving packets state, the wireless sensor terminals s receive a temporary timetable-attached data request packet 601. FIG. 12 illustrates the sequence in which the wireless sensor terminal $s_k$ receives the temporary timetable-attached data request packet 601, and then a wakeup receiver $w_{(k+1)}$ receives the wakeup packet 1201. However, this order may be a reverse order.

After the temporary timetable-attached data request packet 601 reaches the wireless sensor terminal $s_{(k+7)}$ that is a data request destination by the procedures, the wireless sensor terminal $s_{(k+7)}$ generates a requested data packet 602, and transmits the data packet 602 in accordance with the timing described in the temporary timetable.

In the process, in downlink communication (communication in the direction to go away from the aggregator), the wireless sensor terminals s are sequentially woken up by the wakeup receivers w. However, in uplink communication (communication in the direction to come close to the aggregator), since the temporary timetable is already delivered, the wireless sensor terminals s transmit and receive the packet at the timing described in the table, and the wakeup receivers w do not wake up the wireless sensor terminals s.

Figure 13:
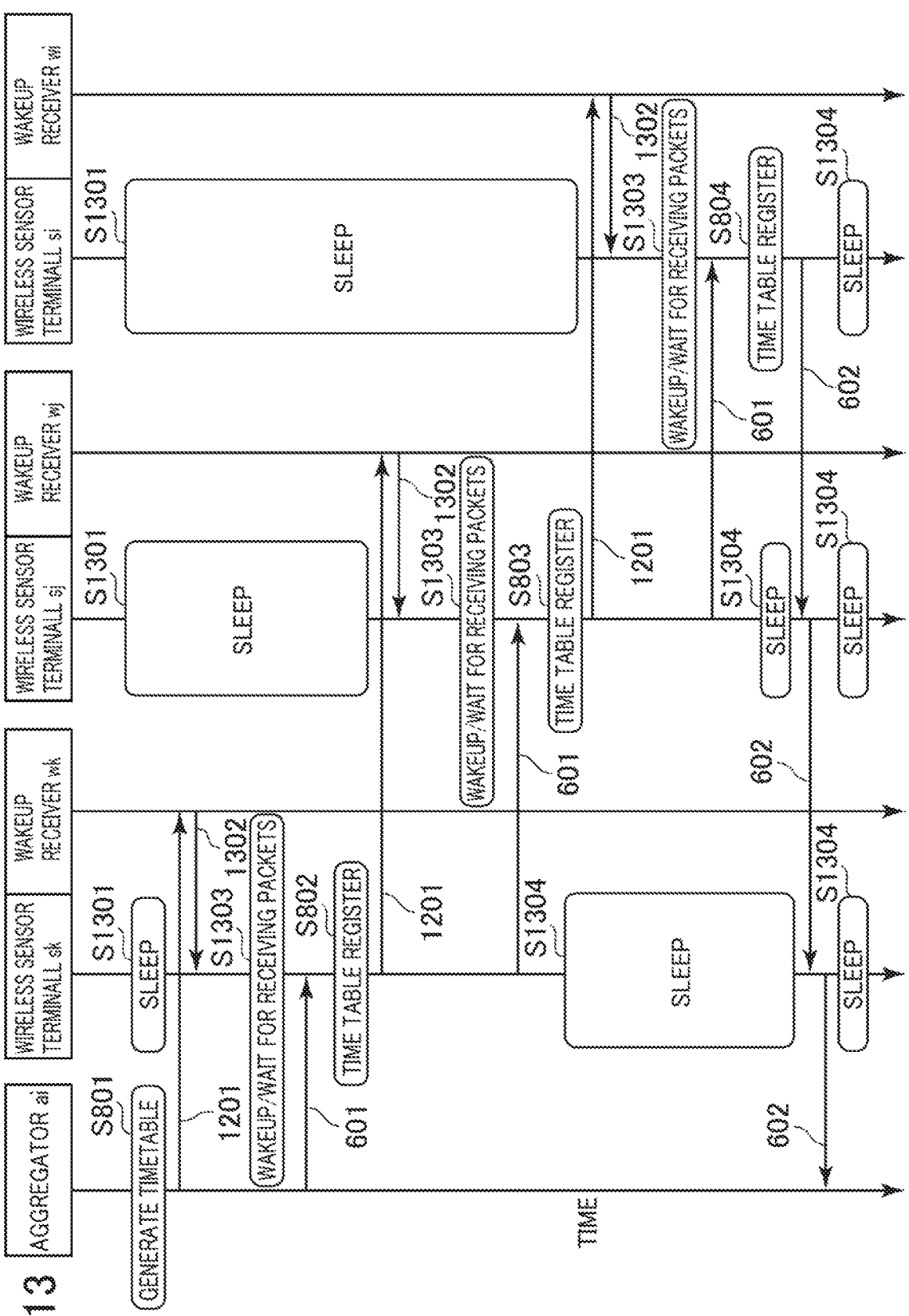
FIG. 13 is a time chart of operation sequences in multihop data transmission according to the other embodiment.

FIG. 13 illustrates a time chart of the communication sequence. Compared with the first embodiment (FIG. 8), the wireless sensor terminals s substantially wake up at timing necessary for communication, and constantly sleep (S1301, S1304) at the other timing. Thus, low power consumption is implemented.

The wakeup receivers w are basically constantly in the wait for receiving packets state. After receiving the wakeup packet 1201, the wakeup receivers w transmit a wakeup command 1302 to the wireless sensor terminals s to cause the wireless sensor terminals s to transition from the sleep state (S1301) to the wakeup/wait for reception state (S1303). The other basic operations are similar to FIG. 8.

The description is made using the wireless sensor terminal $s_k$ and the wakeup receiver $w_k$ as examples. The wireless sensor terminal $s_k$ is in the sleep state in default (S1301). After receiving the wakeup packet 1201, the wakeup receiver $w_k$ transmits the wakeup command 1302 to the wireless sensor terminal $s_k$ to cause the wireless sensor terminal $s_k$ to transition to the wakeup/wait for reception state (S1303).

After receiving the temporary timetable-attached data request packet 601 that is transmitted later, the wireless sensor terminal $s_k$ having woken up registers the temporary timetable 703 (S802). After that, the wireless sensor terminal $s_k$ transmits and receives the packet in accordance with the schedule of the temporary timetable 703. Other than transmission timing and reception timing, the wireless sensor terminals s transition to the sleep state (S1304) to only monitor time using the timer, for example, the wireless sensor terminals s wake up at transmission timing and reception timing, and thus power consumption can be reduced. Note that, control in which the wireless sensor terminals s move to the sleep state (S1304) other than transmission timing and reception timing based on the temporary timetable 703 is similarly possible also in the first embodiment.

Figure 14:
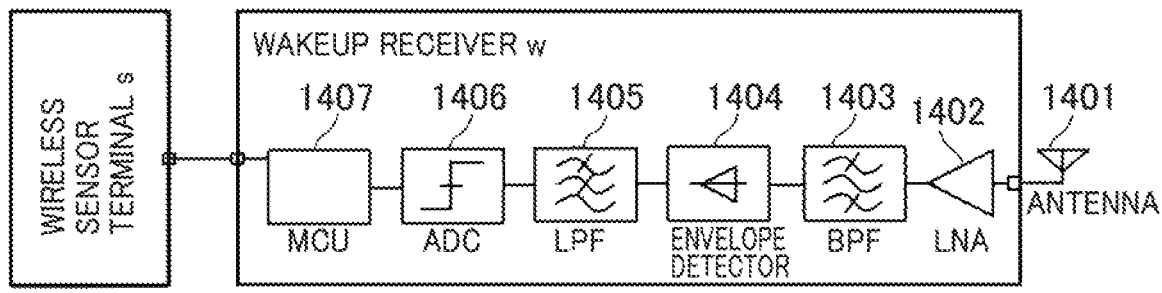
FIG. 14 is a block diagram illustrating the connection between the wireless sensor terminal and a wakeup receiver according to the other embodiment and the configuration of the wakeup receiver.

FIG. 14 is a block diagram illustrating the connection between the wireless sensor terminal s and the wakeup receiver w according to the embodiment and the configuration of the wakeup receiver w.

Here, the wireless sensor terminal s is connected the wakeup receiver w in one to one. The wakeup receiver w only has to identify information to be woken up, which is included in the received wakeup packet 1201. Thus, the wakeup receiver w can have a low power consumption configuration with simplified functions. In the case where the address information is a self-owned terminal ID or the address information is a broadcast ID, the wakeup receiver w transmits the wakeup command 1302 to wake up the wireless sensor terminal s. For an example, the address information can be the bit length of the wakeup packet 1201.

Similarly to the description above, FIG. 14 illustrates an exemplary configuration of the wakeup receiver w in the case where the address information is the bit length of the packet. The wireless packet received at an antenna 1401 is amplified using an amplifier 1402, out-of-band noise is removed using a bandpass filter (BPF) 1403, and the wireless packet is processed at an envelope detector 1404. Signals are equalized at a lowpass filter (LPF) 1405, digital signals are outputted from an analogue-to-digital converter (ADC) 1406, and bits are counted at a micro controller unit (MCU) 1407.

When the counted value is matched with address information registered at the MCU, the wakeup command 1302 is generated to wake up the wireless sensor terminal s, whereas when the counted value is not matched, nothing is executed.

Figure 15:
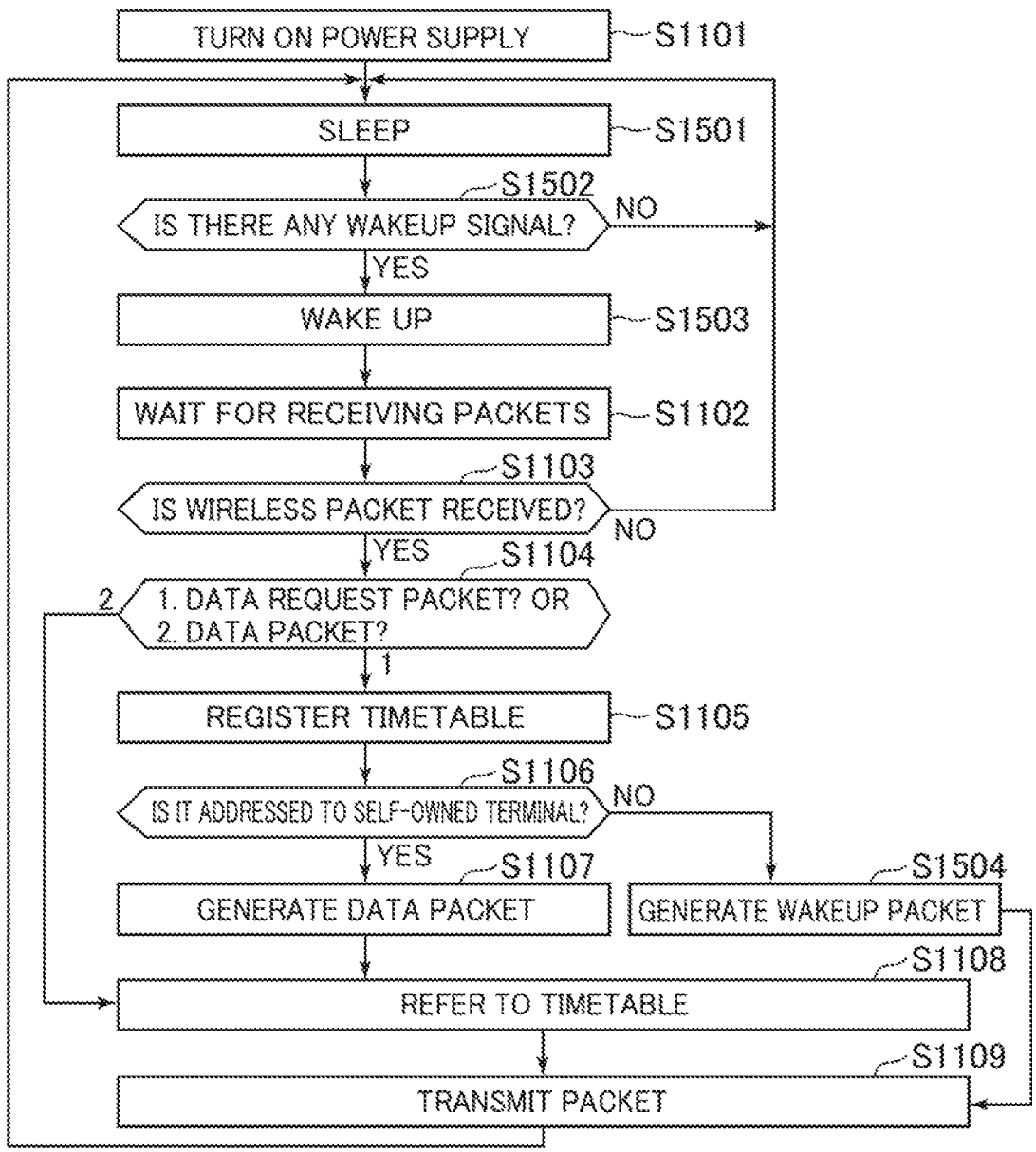
FIG. 15 is a flowchart of the operation of the wireless sensor terminal according to the other embodiment.

FIG. 15 is a flowchart of the operation of the wireless sensor terminal s according to the embodiment. When FIG. 15 is compared with FIG. 11 in the first embodiment, the step of moving to the constant sleep state (S1501), the step of checking a wakeup signal from the wakeup receiver w (S1502), and the step of causing the wireless sensor terminal s to the wakeup state when the wakeup signal is received (S1503) are added.

In the case where the data request packet is not addressed to the self-owned terminal, the wireless sensor terminal s generates a wakeup packet (S1504) and transmits the packet in order to wake up a wireless sensor terminal which is in the next multihop path to the wireless sensor terminal to be the destination of the data request packet. The interference between the wakeup packets 1201 can be avoided by providing protection that prevents the aggregator from issuing another data request, or by using a temporary timetable for downlink communication (only transmission timing is described), during the period in which a certain data request packet is transmitted and a data packet (sensor data) requested for the data request packet reaches the aggregator (in this session) or during certain time in which time is counted using a timer, for example, after a certain data request packet is transmitted. Settings are provided using the temporary timetable in which communication is started at timing at which the transmitting of the wakeup packet 1201 is finished. With these settings, the interference with sensor data can be avoided.

Figure 16:
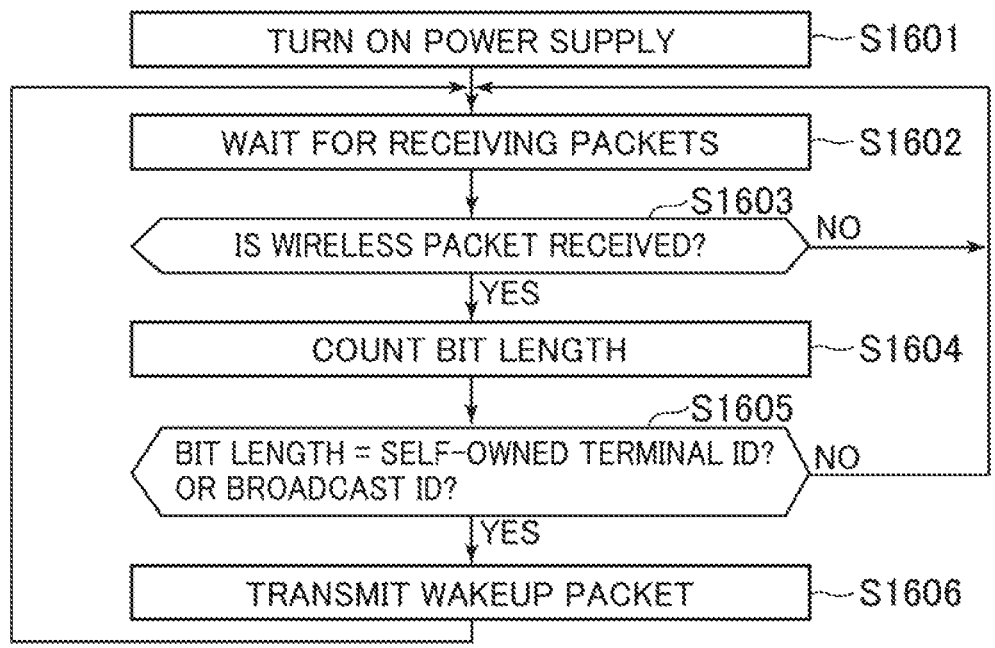
FIG. 16 is a flowchart of the operation of the wakeup receiver according to the other embodiment.

FIG. 16 is a flowchart of the operation of the wakeup receiver w. After the power supply is turned on (S1601), the wakeup receiver w enters the wait for receiving packets state (S1602). Upon receiving a wireless packet (S1603), the wakeup receiver w counts the bit length (S1604). When the bit length does not indicate the self-owned terminal ID, the wakeup receiver w ignores the bit length, and returns to the wait for receiving packets state.

When the bit length is the self-owned terminal ID or broadcast ID (S1605), the wakeup receiver w generates a wakeup packet, transmits the packet to the wireless sensor terminal (S1606), and causes the wireless sensor terminals s to wake up from the sleep state.

FIG. 17 illustrates an example of a temporary timetable 703-2 according to the embodiment. The upper part of each of frames 1701 indicates wakeup time to transmit and receive packets. The lower part indicates finish time. In the embodiment, downlink communication is implemented at given timing by on-demand wakeup/communication using the wakeup packet 1201. Thus, the temporary timetable 703-2 includes only timing instructions for uplink communication.

Third Embodiment

FIG. 18 illustrates the packet content of a data packet (uplink communication) 601-2 including a temporary timetable according to a third embodiment. The description in common with FIG. 7 in the first embodiment is omitted, and the difference will be described. The embodiment includes the procedures to remove the temporary timetable.

In the first embodiment or the second embodiment, a packet ending flag 1801 is inserted into the data section of a packet including a temporary timetable. The packet ending flag 1801 is used as a flag bit whether the packet is the last packet at the data packet generation source (i.e., the transmit destination of the data request packet) in this session.

The wireless sensor terminals s in the multihop path confirm the packet ending flag 1801 of the transfer packet. If the packet ending flag 1801 is ON, the wireless sensor terminals s determine that their roles are finished, and remove the temporary timetable 703 or 703-2. The wireless sensor terminals s immediately move to the sleep mode as necessary. If the packet ending flag 1801 is OFF, the wireless sensor terminals s determine that their roles are not finished, and continuously use the temporary timetable.

Figure 19:
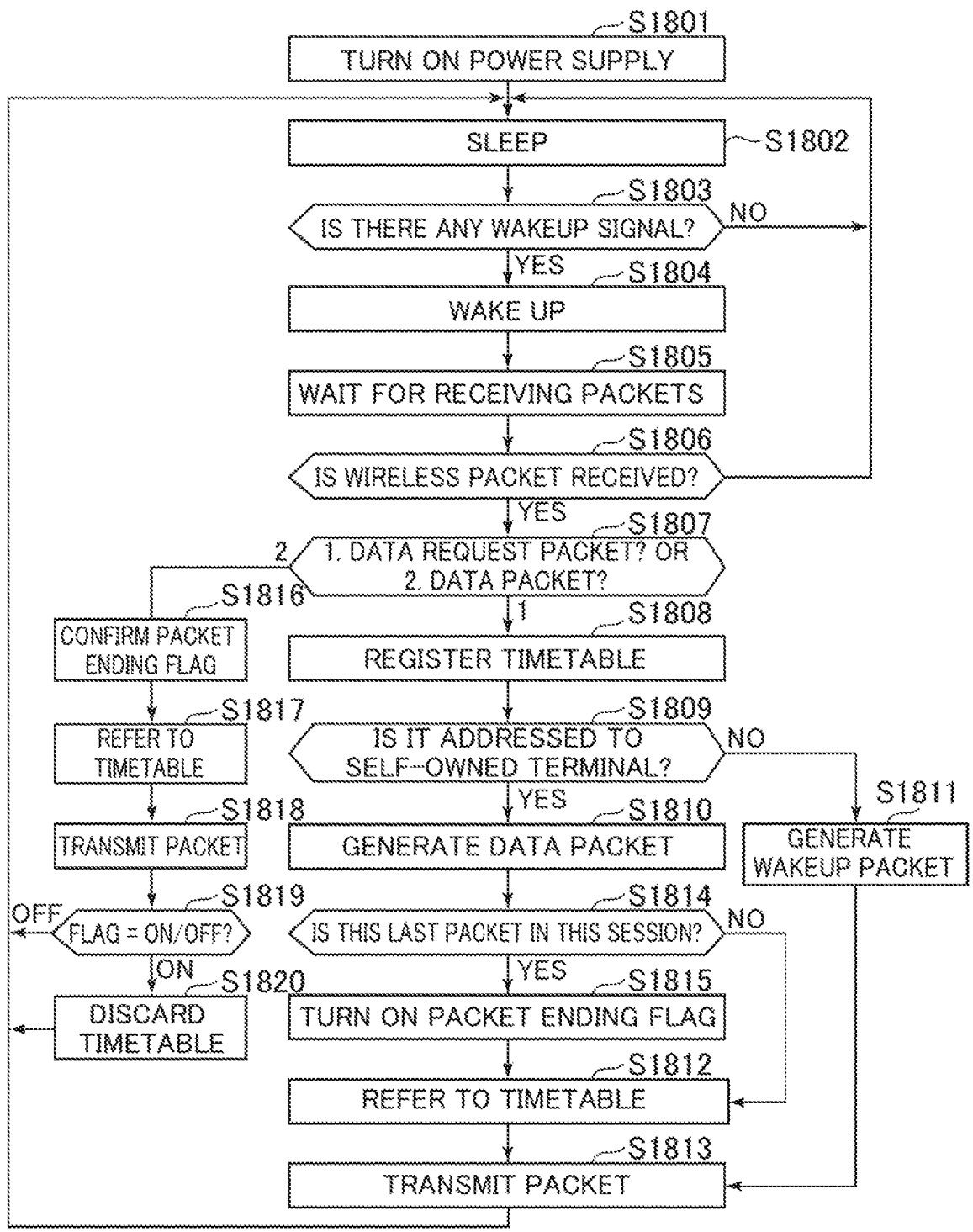
FIG. 19 is a flowchart of the operation of the wireless sensor terminal including the procedures of removing the temporary timetable according to the other embodiment.

FIG. 19 is a flowchart of the operation of the wireless sensor terminal s including the procedures to remove the temporary timetable. The difference from FIG. 15 is a process in a process flow in the reception of a data request packet or a data packet after a wireless packet is received (S1806 corresponding to S1103 in FIG. 15). That is, in the process, in the case where a data request packet is received and the request packet is addressed to the self-owned terminal (S1809), the wireless sensor terminal s turns on the packet ending flag (S1815) when the packet is the last packet in this session. In the case of the data packet, the wireless sensor terminals confirms the packet ending flag (S1816). After that, when the flag is ON, the wireless sensor terminal s makes reference to the timetable (S1817), and transfers the packet (S1818). After finishing the transfer, the wireless sensor terminal s discards the temporary timetable (S1820). As an alternative of the packet ending flag 1801 in FIG. 18, a configuration may be possible in which table validity limit information is inserted, this information is used as an item that indicates timetable removal time, and the wireless sensor terminal s removes the timetable at the removal time.

Fourth Embodiment

The functions of the embodiments above can be implemented by controlling other hardware through the microcomputer 301 or 401 executing the program code of software stored on the memory 305, for example. In this case, software can be provided on the system or the device using a storage medium on which the program code is recorded. In this case, the program code itself read from the storage medium implements the functions of the foregoing embodiments. The program code itself and the storage medium on which the program code is recorded configure a fourth embodiment.

In the embodiment, the functions equivalent to the functions configured of software can also be implemented on hardware, such as a field programmable gate array (FPGA) and an application specific integrated circuit (ASIC). These forms are also included in the scope of the invention of the present application.

The present invention is not limited to the foregoing embodiments, and includes various exemplary modifications. For example, a part of the configuration of an embodiment can be replaced by the configuration of another embodiment. The configuration of an embodiment can be additionally provided with the configuration of another embodiment. For a part of the configurations of the embodiments, the configuration of another embodiment can be additionally provided, removed, or replaced.

In accordance with the embodiments described above, temporary time division communication can be implemented to an on-demand communication request from a user. Thus, the unnecessary wakeup of the wireless sensor terminals can be avoided, and this enables the provision of a wireless sensor network with low power consumption. Optimum time division communication can be secured every time when an on-demand communication request is generated from the user. Thus, the embodiments can also respond to multidata types. Explicit radio band pre-allocation to the wireless sensor terminals is eliminated, and this enables a reduction in down time.

What is claimed is:

1. A multihop wireless communication system comprising:
   an aggregation device; and
   a plurality of wireless terminals connected to the aggregation device in wireless connection,
   wherein the aggregation device includes, in a data request packet to request data, a communication requirement to transmit the data, and transmits the data request packet to a first wireless terminal to be a data request destination terminal through a second wireless terminal to be a relay terminal; and
   the relay terminal and the data request destination terminal transmit a data packet including the requested data to the aggregation device in accordance with the communication requirement;
   wherein the first wireless terminal is connected to a wakeup receiver to be a pair;
   upon receiving a wakeup packet, the wakeup receiver transmits a wakeup command to the first wireless terminal to be the pair; and
   the first wireless terminal waits for the wakeup command in a sleep state, and upon receiving the wakeup command, the first wireless terminal transitions to a wait for receiving packets state for the data packet;
   wherein the aggregation device transmits a temporary timetable indicating a timing requirement included in the data request packet; and
   the relay terminal stores at least a part of the temporary timetable in the data request packet, and transmits and receives the data packet in accordance with the timing requirement based on the temporary timetable.

2. The multihop wireless communication system according to claim 1,
   wherein the communication requirement includes the timing requirement that indicates transmission timing and reception timing of the first wireless terminal; and
   the relay terminal performs multihop wireless communication by transmitting and receiving the data packet in accordance with the timing requirement.

3. The multihop wireless communication system according to claim 1,
   wherein the data request packet includes a data type of the data to be requested; and
   the data request destination terminal transmits data corresponding to the data type to the aggregation device.

4. The multihop wireless communication system according to claim 1, wherein the data request packet includes cycle period information of the temporary timetable.

5. The multihop wireless communication system according to claim 1,
wherein the relay terminal transitions between a sleep state and a wait for receiving packets state for the data packet in accordance with the timing requirement based on the temporary timetable.

6. The multihop wireless communication system according to claim 1,
wherein after transmitting the data to the aggregation device, the relay terminal and the data request destination terminal discard at least a part of the stored temporary timetable.

7. The multihop wireless communication system according to claim 6,
wherein the data packet to transmit the data includes a packet ending flag;
the data request destination terminal indicates finishing data transmission on the packet ending flag in transmitting a last data packet to a request for the data; and
the first wireless terminal to be a relay terminal to transmit the last data packets confirms the packet ending flag, and discards at least a part of the temporary timetable stored on the first wireless terminal based on a confirmed result.

8. The multihop wireless communication system according to claim 6,
wherein the data request packet to transmit the data includes table validity limit information; and
when receiving the data request packet, the relay terminal and the data request destination terminal acquire the table validity limit information simultaneously with the temporary timetable, and discards at least a part of the temporary timetable stored on the relay terminal and the data request destination terminal based on the table validity limit information.

9. An aggregation device configured to aggregate data from a plurality of wireless terminals by multihop wireless communication,
wherein the aggregation device generates a data request packet to request the data, and transmits the data request packet to a wireless terminal of the plurality of wireless terminals to be a data request destination terminal through the wireless terminal to be a relay terminal; and
the data request packet includes a temporary timetable indicating at least one timing to transmit and receive the data at the wireless terminal to be the relay terminal and the wireless terminal to be the data request destination terminal;
wherein the wireless terminal is connected to a wakeup receiver to be a pair; upon receiving a wakeup packet, the wakeup receiver transmits a wakeup command to the wireless terminal to be the pair; and the wireless terminal waits for the wakeup command in a sleep state, and upon receiving the wakeup command, the wireless terminal transitions to a wait for receiving packets state for the data packet;
wherein the aggregation device transmits a temporary timetable indicating a timing requirement included in the data request packet; and
the relay terminal stores at least a part of the temporary timetable in the data request packet, and transmits and receives the data packet in accordance with the timing requirement based on the temporary timetable.

10. The aggregation device according to claim 9,
wherein the data request packet includes a request data type to be requested to the data request destination terminal.

11. A wireless terminal that is a wireless terminal to be a source terminal for transmitting data or a relay terminal used for a multihop wireless communication system,
wherein when the wireless terminal receives a data request packet to request the data as the relay terminal, the wireless terminal stores information indicating transmission timing and reception timing of the wireless terminal included in the data request packet; and
the wireless terminal transmits and receives the requested data based on the transmission timing and the reception timing;
wherein the wireless terminal is connected to a wakeup receiver to be a pair;
upon receiving a wakeup packet, the wakeup receiver transmits a wakeup command to the wireless terminal to be the pair; and
the wireless terminal waits for the wakeup command in a sleep state, and upon receiving the wakeup command, the wireless terminal transitions to a wait for receiving packets state for the data packet;
wherein the appreciation device transmits a temporary timetable indicating a timing requirement included in the data request packet; and
the relay terminal stores at least a part of the temporary timetable in the data request packet, and transmits and receives the data packet in accordance with the timing requirement based on the temporary timetable.

12. The wireless terminal according to claim 11,
wherein the wireless terminal stores information indicating a period for transmission timing and reception timing of the wireless terminal, the information being included in the data request packet; and
the wireless terminal transmits and receives the data based on the period for the transmission timing and the reception timing.

13. The wireless terminal according to claim 11,
wherein the wireless terminal switches between a sleep state and a reception standby state for the data based on the transmission timing and the reception timing.

* * * * *